Sept. 20, 1955  F. W. HARRIS  2,718,534
PROCESS FOR PRODUCING ACETYLENE
Original Filed Sept. 20, 1948  2 Sheets-Sheet 1

INVENTOR:
FORD W. HARRIS
BY HIS ATTORNEYS
HARRIS, KIECH, FOSTER & HARRIS

Sept. 20, 1955   F. W. HARRIS   2,718,534
PROCESS FOR PRODUCING ACETYLENE
Original Filed Sept. 20, 1948   2 Sheets-Sheet 2
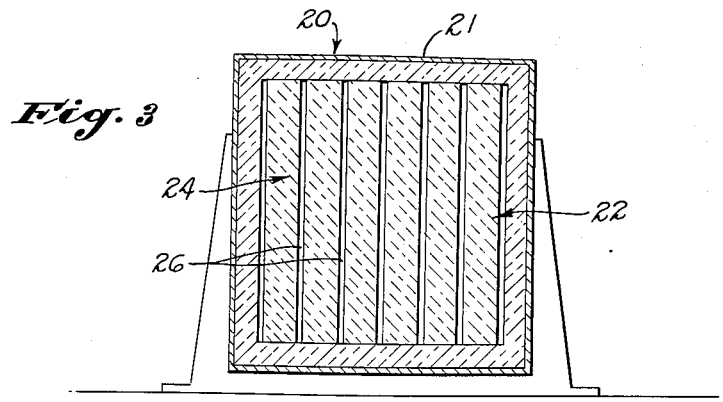
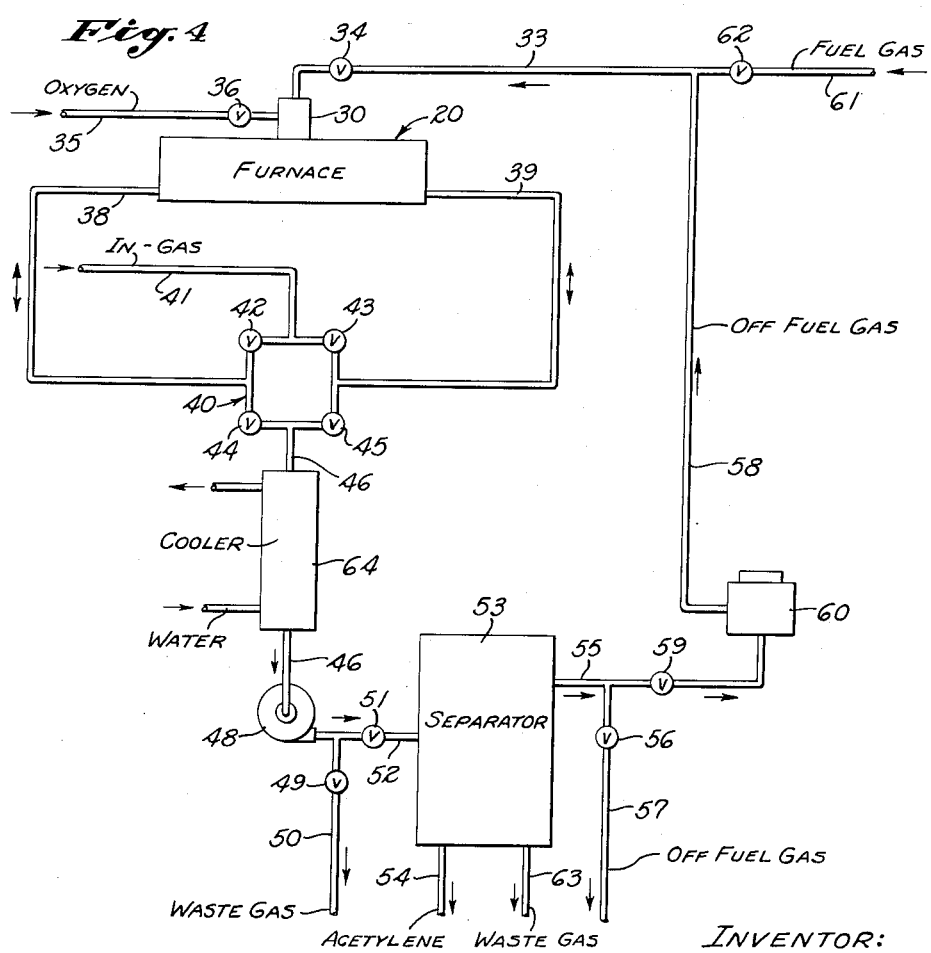

United States Patent Office 2,718,534
Patented Sept. 20, 1955

2,718,534

PROCESS FOR PRODUCING ACETYLENE

Ford W. Harris, Los Angeles, Calif., assignor to Wulff Process Company, Huntington Park, Calif., a corporation of California Original application September 20, 1948, Serial No. 50,198. Divided and this application November 25, 1950, Serial No. 197,607

1 Claim. (Cl. 260—679)

This invention is a division of my copending application for Process for Producing Acetylene, Serial No. 50,198, filed September 20, 1948.

My invention relates to the production of acetylene by the pyrolysis of a suitable primary hydrocarbon.

The term "in-gas" is used herein to define the gas which is delivered from a source outside the process and subjected to pyrolysis in the process. The term "off-gas" is used herein to define the gas which results from and is formed by pyrolysis of the in-gas.

The term "in-gas" as used herein is limited to in-gases which are, or which contain, a suitable primary hydrocarbon, the term "suitable primary hydrocarbon" as used herein meaning a hydrocarbon which, when the in-gas is heated below 3000° F., breaks down to release hydrogen and form acetylene. Methane and the olefins which are gaseous at atmospheric temperature and pressure are suitable primary hydrocarbons.

When an in-gas which is at or near atmospheric pressure is subjected to pyrolysis for the purpose of forming acetylene, it must be brought up to a temperature at which acetylene starts to form. The heat supplied to the in-gas merely to raise its temperature to a point where acetylene forms is hereinafter called "recoverable heat," since in my process a substantial portion of this heat is recovered from a regenerative mass which has been heated by off-gas.

In addition to said recoverable heat, sufficient additional heat, hereinafter called "reaction heat," must be supplied to supply the heat needed to cause the endothermic reaction from the primary gas to acetylene. This heat is required before the in-gas becomes hot enough to break down to release hydrogen and form acetylene, this temperature being herein called the "critical temperature" of the primary hydrocarbon. The critical temperature of methane is above 2000° F., and the critical temperature of the gaseous olefines is somewhat lower. The critical temperature of any primary hydrocarbon, if it is unknown to the operator of the process, can be readily found by a person skilled in the art by ordinary laboratory methods.

Acetylene may be inadvertently formed in many processes, but an off-gas containing less than one per cent (1%) by volume of acetylene has little value for the production of acetylene due to the cost of separating the acetylene from the off-gas, and the term "valuable off-gas" as used herein means an off-gas containing more than one per cent (1%) by volume of acetylene.

It is an object of my invention to produce a valuable off-gas from a suitable in-gas.

It is an object of my invention to provide a process by which a substantial portion of the recoverable heat is extracted from the off-gas and stored in a regenerative mass from which it is transferred to the in-gas.

It is an object of my invention to provide a process by which the reaction heat, and all other heat needed to carry on the process, is supplied by combustion gas formed by burning a fuel gas which may be waste gas from the process.

It is a further object of my invention to provide a process by which methane can be converted, at least in part, to acetylene.

It is a further object of my invention to provide a process by which an in-gas can be heated above the critical temperature of a primary hydrocarbon carried therein, by passing the in-gas through slots in a regenerative mass, to supply the necessary recoverable heat thereto, the in-gas being then supplied in part with the necessary heat of reaction by hot gases added thereto, and the resulting off-gas mixture is cooled by passing through slots in a regenerative mass in which the off-gas is cooled to a temperature below the critical temperature.

It is a further object of my invention to provide a process by which all or part of the heat of reaction is supplied by combustion of portions of the in-gas during the formation of the off-gas.

Further objects and advantages will be made evident hereinafter.

In the drawings:

Fig. 3 is a cross section of the furnace shown in Fig. 1 on a plane defined by the line c—c of Fig. 1; and Fig. 4 is a diagram showing the entire apparatus.

Figure 1:
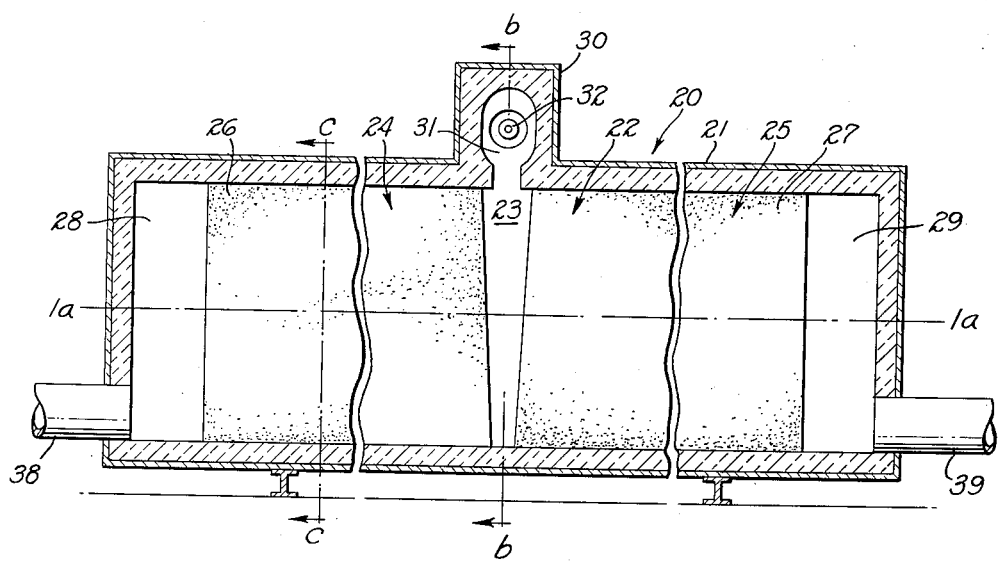
Fig. 1 is a cross section of a furnace suited to carry on my process, this section being taken on a plane defined by the line a—a of Fig. 2.

A furnace 20 adapted to carry on my process and produce about 150,000 lbs. of acetylene in twenty-four hours from a natural gas or other in-gas containing 90% or more of methane may be constructed as follows, it being understood that this furnace will operate satisfactorily on other types of in-gas, particularly on in-gas containing substantial amounts of olefines.

The furnace comprises a steel shell 21 which may be of square section as shown in Fig. 3 if the furnace is operated as in the example herein described, with the gas passing therethrough at or near atmospheric pressure, or round, as may be necessary if the gas in under relatively high superatmospheric pressure or under a substantial vacuum. Since good results may be obtained operating the furnace with the gases at or near atmospheric pressure, a square furnace is shown.

The furnace shown has its major axis 1a—1a horizontal, but vertical furnaces may be used, and words like "up" or "down" as used herein indicate merely relationship of parts and are not used in a gravitational sense.

Inside the furnace is a regenerative mass 22 which may be divided by a central space 23 into a first mass 24 and a second mass 25. The regenerative mass should have a cross-sectional area, as seen in Fig. 3, of about twenty-five square feet, or it should be about five feet square. Extending through the furnace are slots which are about ⅜ in. wide and five feet deep.

The walls between the slots are preferably formed of silicon carbide bricks, not specifically shown, each of which has small ears or protuberances on one side thereof which project into the slots and space these bricks to form the slots.

The slots through the first mass 24 are identified as first slots 26, and the slots through the second mass 25 are identified as second slots 27.

A first end space 28 and a second end space 29 are provided at either end of the furnace, as shown. Gas is delivered to the end spaces 28 and 29 from the slots 26 and 27, and these slots also receive gas from these end spaces.

The regenerative mass 22 should preferably be formed of silicon carbide, that is, the product commonly sold as Carborundum, although any material having a high heat conductivity and a high specific heat, and which may be subjected to temperatures between 2000° F. and 3000° F. without injury, might be used. Silicon carbide is the best material known to me at this time for this purpose, and the furnace herein described is proportioned on the basis of use of this material. Using this material proportioned about as described, the regenerative mass should be about thirty feet long.

On the top of the shell 21 is a steel dome 30 which encloses a combustion chamber 31 which is in open communication with the central space 23 in the regenerative mass 22.

The dome 30 and the entire inside wall of the shell 21 should have a layer of heat insulating and refractory material with a low heat conductivity inside of which is a layer of silicon carbide, these layers being each about five inches thick.

Figure 2:
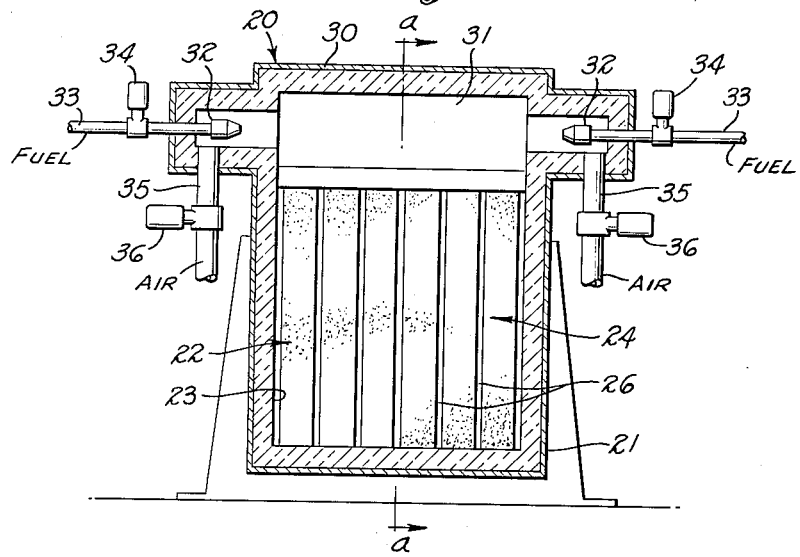
Fig. 2 is a cross section of the furnace shown in Fig. 1 on a plane defined by the line b—b of Fig. 1.

On either side of the combustion chamber 31, as shown in Fig. 2, is a firing chamber into which a fuel nozzle pipe 32 projects as shown in Fig. 2. Fuel gas is supplied to the nozzle pipe 32 from a fuel gas pipe 33 through a fuel gas valve 34. Oxygen, or air, is supplied to each firing chamber from an oxygen pipe 35 through an oxygen valve 36. Due to combustion initiated in each firing chamber, gases of combustion are produced in the combustion chamber 31 and pass down into the central space 23 between the first regenerative mass 24 and the second regenerative mass 25.

A first end space pipe 38 delivers in-gas to the first end space 28 and withdraws off-gas therefrom, and a second end space pipe 39 delivers in-gas to and withdraws off-gas from the second end space 29. Since the in-gas is at or near atmospheric temperature and the off-gas is below the critical temperature, these pipes do not need internal heat insulation.

Referring to Fig. 4, a valve change assembly 40 should be provided for governing the direction of flow of gas through the slots 26 and 27, and this assembly should preferably be operated automatically in a recurring cycle, as hereinafter described. In-gas is delivered to this assembly 40 through an in-gas pipe 41 which delivers in-gas to a first in-gas valve 42 and a second in-gas valve 43. Off-gas is delivered from the assembly through a first off-gas valve 44 and a second off-gas valve 45 to an off-gas pipe 46. In-gas may be delivered through the valve 42 to the first end space pipe 38 or to the second end space pipe 39 through the valve 43. Off-gas may be taken from the first end space pipe 38 through the valve 44 and from the second end space pipe 39 through the valve 45 to the off-gas pipe 46. An exhauster 48 draws gas from the off-gas pipe 46 and may deliver it through a waste gas valve 49 to a waste pipe 50 or through a separator gas valve 51 to a separator inlet pipe 52.

The separator inlet pipe 52 delivers off-gas to a separator assembly 53 in which various gases may be separated from the off-gas. Acetylene so separated may be delivered from the separator 53 through an acetylene pipe 54. Hydrogen, with which other gases, notably carbon monoxide, may be mixed to form a combustible off fuel gas, is delivered from the separator assembly 53 through an off fuel gas pipe 55. The process, operating as hereinafter described, produces an excess of off fuel gas which may be withdrawn through a valve 56 in a pipe 57. A portion of the off fuel gas is delivered through a valve 59 to a pipe 58 which delivers the off fuel gas to the pipe 33 and through the valve 34 to the burner nozzle pipe 32.

For convenience, a small gas holder 60 may be placed in the pipe 58 to equalize the flow of off fuel gas. Fuel gas from an outside source may also be delivered to the pipe 33 from a fuel gas pipe 61 having a valve 62. Waste gases, including carbon dioxide, steam and other by-products of the process, may be withdrawn from the separator assembly through a waste off-gas pipe 63. A cooler 64 may be used to cool the off-gas in the pipe 46, although this is not absolutely necessary.

Many methods of gas separation and separator assemblies known to those skilled in the art are capable of separating from a gaseous mixture various gases contained in said mixture and any of these methods and assemblies can be used to separate the acetylene and other gases from the off-gas.

After the furnace has been in operation long enough to fill the gas holder 60, the valve 62 may be closed and combustion in the combustion space 31 can be supported wholly by off fuel gas from this gas holder.

The furnace above described is well suited to subject any in-gas containing a suitable primary hydrocarbon, as above defined, to pyrolysis to produce acetylene. It was, however, designed to process an in-gas in which the primary hydrocarbon is methane, and the following description of a method of operation is given, and a definite apparatus is described, merely as an example of how methane can be converted to acetylene.

If an in-gas which contains an olefine as a primary hydrocarbon is processed, lower temperatures than those later specified may be used. The operation hereinafter described applies to the use of natural gas or any gas which is predominantly methane.

All of the apparatus being cold, the method of operation of the process is put into cyclic operation as follows:

The exhauster 48 is started with the valves 44, 36, 34 and 49 open and all other valves closed. Oxygen, or air, is then supplied through the pipe 35, and fuel gas is supplied through the pipes 33 and 61 to the combustion space 31 producing hot gases of combustion which are drawn by the draft produced by the exhauster into the space 23. The gases of combustion are then drawn from right to left, as seen in Fig. 1, through the first slots 26 into the first end space 28 and through the pipe 38, the valve 44, and the pipe 46, into the exhauster 48 from which the gas is wasted through the valve 49 and pipe 50. This flow of hot gas continues until the righthand end, as shown in Fig. 1, of the first mass 24 is heated to a maximum temperature. The term "maximum temperature" as used herein means merely the highest temperature to which the regenerative material can be heated without rapid deterioration, this temperature being about 3000° F. for silicon carbide. When this temperature is reached, the starting period is completed and the furnace may be put into cyclic operation.

To produce satisfactory results, the walls of the right-hand ends, as shown in Fig. 1, of the first slots 26 should be initially at about the maximum temperature the regenerative mass will stand without rapid deterioration. Of course, the left-hand ends of the slots 27 in the second mass 25 are also raised to an elevated temperature by the flow of hot gas into the space 23.

The valves 45, 42, and 51 are then opened, and the valves 44 and 49 are closed. In-gas from the pipe 41 flows through the valve 42 and the pipe 38 into the end space 28. The gas flows preferably at a velocity of about 9000 feet a minute through the first slots 26 to the space 23 where hot products of combustion from the combustion chamber 31 are mixed with the gas, the mixture then flowing through the second slots 27 to the second end space 29. An off-gas is formed in the passage of the gas through the furnace, and this off-gas passes through the pipe 39 and the valve 45, through the cooler 64, to the exhauster 48. It is then delivered through the valve 51 and the pipe 52 to the separator 53.

The in-gas, in passing through the first slots 26, is heated to a temperature somewhat lower, and perhaps 400° F. lower, than the temperature of the right-hand end, as seen in Fig. 1, of the mass 24. At this temperature methane breaks down to form acetylene and release hydrogen. The in-gas may enter the first slots 26 at atmospheric temperature, and as it flows through the first slots 26 it is heated and cools the walls of the slots. The in-gas abstracts enough reaction heat from the left-hand end of the second mass 25 to reduce the temperature of the mass 25 at this point. This is due to the fact that the temperature of the left-hand ends of the slots 27 has been raised by the hot gases from the chamber 31. However, the greater part of the length of the slots 27 is cooler than the off-gas and serves to cool it as it flows therethrough.

It is desirable, during the entire cyclic operation of the furnace, to maintain nearly complete combustion in the combustion chamber 31, although if excess air is supplied so that the combustion products delivered to the space 23 contain excess free oxygen, partial combustion of the hydrogen released from the in-gas will occur in the space 23 and the second slots 27. This partial combustion is desirable in that it raises the temperature of the gas above the temperature of the regenerative mass, but it must be resorted to with care as these higher temperatures may injure the mass. The safest method of operation is to maintain nearly all the combustion in the combustion chamber 31, but a skilled operator can indulge in considerable partial combustion in the slots 27. The operator should watch his temperature indicators and hold the temperature of all parts of the regenerative mass below 3000° F. if silicon carbide is used as a regenerative material, as otherwise it will rapidly deteriorate.

As the gas flows from left to right in the second slots 27 as seen in Fig. 1, the gas is cooled and the average temperature of the walls of the second slots 27 is raised, due to the flow of hot off-gas therethrough. Acetylene is formed, to produce an off-gas rich in acetylene, in the right-hand end of the first slots 26, the central space 23, and in the left-hand portion of the slots 27, and this off-gas will be cooled in its further progress through the slots 27 to a temperature substantially below 1200° F. at which temperature acetylene is stable. This off-gas may then be cooled further in the cooler 64 before being passed to the exhauster 48.

If it is desired to produce partial combustion in the central space 23, the valve 34 may be partially closed to reduce the amount of fuel gas delivered to the combustion chamber 31 and to thus release more free oxygen to the central space 23. The flow of gas from left to right, as seen in Fig. 1, is stopped before the temperature of the off-gas in the second end space 29 rises to 1200° F. The rise in temperature of the off-gas is due to the fact that the slots grow progressively hotter as the off-gas passes therethrough. The flow of gas through the regenerative mass 22 is then reversed by closing the valves 42 and 45 and opening the valves 43 and 44.

The flow of in-gas into the second end space 29 and from right to left through the slots 27 and 26 is continued until the off-gas in the first end space rises to a temperature close to 1200° F., and the cycle is then recurrently repeated. Each step of the cycle, that is, each flow in each direction, may be about one minute in the furnace above described, operated as above described.

Such a furnace using natural gas as in-gas will process about 7200 cubic feet of gas per minute, this gas being delivered through the pipe 41, and about 14,000 cubic feet of air must be delivered through the pipe 35 to provide adequate combustion. The average velocity of the gas in the slots should be about 9000 feet per minute. The off-gas will contain about 12% of methane, and about 45% of the carbon in the in-gas will be fixed in the acetylene of the off-gas. The off fuel gas delivered from the separator to the pipe 55 will contain about 20% carbon monoxide and 70% hydrogen. It will be found after the furnace is in operation that the valve 62 may be closed, thus shutting off the flow of fuel gas from the pipe 61, and the valve 57 can be partially opened to bleed off fuel gas from the system, as the off fuel gas can supply more than enough gas to furnish all the heat needed by the furnace.

The above description is limited to the use of methane as a primary gas, but the same furnace and process can be used to produce acetylene from in-gases containing other suitable hydrocarbons and will produce secondary gas other than acetylene from methane or other suitable hydrocarbon; for example, ethylene, propylene, and butylene may be produced. The furnace may also be used for other purposes than to produce such secondary gases.

By alternating the direction of flow of the gas through the furnace, that portion of the regenerative mass into which the in-gas is fed heats the in-gas by giving up a portion of the recoverable heat stored therein during the previous step, and the major part of the other half of the mass cools the off-gas to a temperature at which the acetylene is stable, at the same time absorbing a portion of the recoverable heat which will be given up in the succeeding step.

All the reaction heat and all the heat needed to supply the heat losses of the process are derived from combustion. Preferably the major portion of this heat is derived from off fuel gas, but some of this heat may come from partial combustion of the off-gas. Due to this partial combustion and the introduction of combustion products into the space 23 from the combustion space 31, the temperature of the gas in the space 23 and in the slots into which it is delivered from the space 23 may be substantially above the maximum temperature of that portion of the regenerative mass which has been cooled in the previous step by the flow of in-gas. This produces a very fast and complete reaction. If excess oxygen is present in these gases of combustion, very little carbon monoxide is present in these gases, and a high heat economy is obtained.

I claim as my invention:

A method of producing a valuable off-gas containing acetylene from an in-gas containing a suitable hydrocarbon which comprises: passing the in-gas inwardly into a furnace through spaces in a first regenerative mass, the inner end of which is hotter than its outer end; mixing hot products of combustion with said in-gas after it leaves said first regenerative mass; withdrawing the hot mixture of gases so produced from said furnace through spaces in a second regenerative mass, the inner end of said second mass being hotter than its outer end; and periodically reversing the direction of flow of said gas so that the in-gas enters the furnace through the second mass and leaves the furnace through the first mass.

References Cited in the file of this patent

UNITED STATES PATENTS

| | | |
|---|---|---|
| 1,965,770 | Burgin | July 10, 1934 |
| 1,965,771 | Groll et al. | July 10, 1934 |
| 2,343,866 | Hincke | Mar. 14, 1944 |
| 2,377,847 | Allen et al. | June 12, 1945 |
| 2,498,444 | Orr | Feb. 21, 1950 |

FOREIGN PATENTS

| | | |
|---|---|---|
| 458,692 | Great Britain | Dec. 24, 1936 |
| 578,311 | Germany | June 13, 1933 |
| 605,640 | Germany | Nov. 20, 1934 |